United States Patent [19]
Brobst et al.

[11] Patent Number: 6,053,409
[45] Date of Patent: *Apr. 25, 2000

[54] DYNAMIC FOCUSING APPARATUS FOR AN OPTICAL IMAGING SYSTEM USING A DEFORMABLE MIRROR

[75] Inventors: Thomas J. Brobst, Allentown; Edward I. Chaleff, Doylestown; Kurt Hecht, Hartsville, all of Pa.; Michael L. Veksland, Marlton, N.J.; Albert Wurz, Doylestown, Pa.

[73] Assignee: Accu-Sort Systems, Inc., Telford, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,653

[22] Filed: Jun. 24, 1997

Related U.S. Application Data

[63] Continuation of application No. 08/612,359, Mar. 7, 1996, abandoned.

[51] Int. Cl.⁷ ........................................ G06K 7/10
[52] U.S. Cl. .................. 235/462.36; 235/462.06; 235/462.22; 235/462.23; 235/462.37; 235/472.01; 250/234
[58] Field of Search ................................ 235/467, 472, 235/454, 462, 462.22, 462.06, 462.36, 462.37, 472.01, 462.23; 250/201.9, 216, 234, 235, 236, 559.38

[56] References Cited

U.S. PATENT DOCUMENTS

| | | | |
|---|---|---|---|
| 3,904,274 | 9/1975 | Feinleib et al. | 350/360 |
| 4,091,274 | 5/1978 | Angelbeck et al. | 250/201 |
| 4,280,756 | 7/1981 | Albertinetti | 350/360 |
| 4,480,892 | 11/1984 | Ishikawa | 350/3.71 |
| 4,538,181 | 8/1985 | Taylor | 358/208 |
| 4,560,862 | 12/1985 | Eastman et al. | 235/462 |
| 4,600,837 | 7/1986 | DiStefano et al. | 250/235 |
| 4,622,593 | 11/1986 | Curry | 358/284 |
| 4,691,212 | 9/1987 | Solez et al. | 346/108 |
| 4,714,830 | 12/1987 | Usui | 250/234 |
| 4,733,064 | 3/1988 | Ishikawa | 250/201 |
| 4,792,018 | 12/1988 | Humble | 186/61 |
| 4,797,558 | 1/1989 | West | 250/572 |
| 4,843,222 | 6/1989 | Hochgraf | 235/462.22 |
| 5,029,956 | 7/1991 | Takanashi et al. | 350/6.8 |
| 5,103,334 | 4/1992 | Swanberg | 359/197 |
| 5,124,538 | 6/1992 | Lapinski et al. | 235/467 |
| 5,136,413 | 8/1992 | MacDonald et al. | 359/213 |
| 5,142,132 | 8/1992 | MacDonald et al. | 250/201.9 |
| 5,170,277 | 12/1992 | Bard et al. | 359/210 |
| 5,173,603 | 12/1992 | Lindacher | 250/236 |
| 5,192,856 | 3/1993 | Schaham | 235/462 |

(List continued on next page.)

FOREIGN PATENT DOCUMENTS

| | | | |
|---|---|---|---|
| 0494647 | 7/1992 | European Pat. Off. | G06K 7/10 |
| 0521196 | 1/1993 | European Pat. Off. | G06K 7/10 |
| 4236355 | 5/1994 | Germany | G02B 26/00 |
| 406167646 | 6/1994 | Japan | 235/462 |
| 07121645 | 5/1995 | Japan | G06K 7/015 |
| 1553941 | 3/1990 | U.S.S.R. | 359/219 |

*Primary Examiner*—Michael G. Lee
*Assistant Examiner*—Douglas X. Rodriguez
*Attorney, Agent, or Firm*—Volpe and Koenig, P.C.

[57] ABSTRACT

A focus changing apparatus for an optical scanner which increases the depth of the field of the optical scanner. The focus changing apparatus is optically located between a laser source and a scan mirror and includes a plurality of alternating curved and flat facets. Alternatively, a piezoelectric deformable mirror may be optically located between the laser source and a flat faceted scan mirror to provide for increased depth of field of the optical scanner.

6 Claims, 12 Drawing Sheets

U.S. PATENT DOCUMENTS

| | | | |
|---|---|---|---|
| 5,198,648 | 3/1993 | Hibbard | 235/462 |
| 5,206,755 | 4/1993 | Yamakawa | 359/218 |
| 5,216,230 | 6/1993 | Nakazawa | 235/462.23 |
| 5,223,700 | 6/1993 | Takenaka | 359/217 |
| 5,276,544 | 1/1994 | Meada | 359/196 |
| 5,289,001 | 2/1994 | Arimoto et al. | 250/236 |
| 5,308,966 | 5/1994 | Danielson et al. | 235/472 |
| 5,386,107 | 1/1995 | Dvorkis et al. | 235/462.23 |
| 5,387,786 | 2/1995 | Peng | 235/462 |
| 5,392,149 | 2/1995 | Boardman et al. | 359/216 |
| 5,461,601 | 10/1995 | Shinada et al. | 369/112 |
| 5,475,523 | 12/1995 | Shinada | 359/209 |
| 5,484,990 | 1/1996 | Lindacher et al. | 235/467 |
| 5,528,024 | 6/1996 | Rockstein et al. | 235/462.22 |
| 5,583,331 | 12/1996 | Dvorkis | 235/462 |
| 5,646,765 | 7/1997 | Laakmann et al. | 359/202 |
| 5,693,929 | 12/1997 | Dvorkis et al. | 235/454 |

DYNAMIC FOCUSING APPARATUS FOR AN OPTICAL IMAGING SYSTEM USING A DEFORMABLE MIRROR

This is a continuation of application Ser. No. 08/612,359, filed on Mar. 7, 1996, now abandoned.

BACKGROUND OF THE INVENTION

1. Field of the Invention

The present invention relates to imaging systems. More particularly, this invention relates to a dynamic focusing apparatus for increasing the depth of field of an imaging system, such as an optical scanner.

2. Description of Related Art

Imaging systems are currently used in a wide variety of applications including materials handling, materials inspection, package routing, data acquisition, document tracking and inventory control. Many of these applications require accurate, high speed imaging of a particular region of interest and acquisition of data pertaining to objects within that region. Due to their accuracy and versatility, imaging systems have been increasingly used for detection and decoding of human or machine readable symbologies. In particular, bar code symbols located on items have been successfully used to increase the speed and accuracy of the tracking of items.

Imaging systems include optical laser scanners and optical charge coupled device (CCD) scanners. Optical laser scanners generally employ a laser diode, a multifaceted polygonal mirror, focusing optics and a detector. The light from the laser diode is collimated and focused onto a multifaceted polygonal mirror. Rotation of the mirror about a central axis produces a scanning beam, which is directed to the symbology to be read. A portion of the light is reflected by the symbology back to the multifaceted polygonal mirror, which reflects the returning beam to a detector.

Typically, the scanning rate of an optical laser scanner is limited by two factors: 1) the scanning rate of the beam; and 2) the depth of field of the scanner. The scanning rate in a system having a multifaceted polygonal mirror is generally determined by the number of facets on the mirror and the available motor speed. The mirror facets must be large enough to accommodate the optical pupil diameter at the entrance to the system and, hence, the mirror structure cannot be arbitrarily small. Additionally, the mirror surface must be large enough to avoid serious vignetting whereby part of the incoming image misses the mirror toward the ends of the horizontal scan line.

With respect to CCD optical scanners, the scanning rate is limited by the speed of the CCD detector and the speed at which the optics change to the desired focal point.

The depth of field of an optical scanner is determined by factors such as optical path length and focusing optics parameters. For low volume applications and applications which require scanning of a plurality of similarly sized and shaped articles, the depth of field of the scanner is not significant since the scanner may be physically moved to focus the scanning beam. However, for applications that require high speed, high volume scanning of articles having different shapes and sizes, the depth of field of a scanner becomes critical. Although the depth of field of a scanner may be increased by mechanically repositioning a lens, this method is often too slow for high speed scanning.

Accordingly, it would be desirable to provide a means for increasing the depth of field of an imaging system without decreasing performance or increasing the cost and complexity of the system.

SUMMARY OF THE INVENTION

The present invention provides a dynamic focusing apparatus for an optical imaging system. In the preferred embodiment the focusing apparatus includes a laser source, a detector and a multifaceted rotating polygonal mirror with a plurality of concave, convex and flat facets. The laser beam is directed to the polygonal mirror and is reflected by each successive facet to provide a scanning beam across a region of interest. Each concave or convex facet may have a different optical power. The scanning beam is focused at a plurality of depths within the region of interest for each rotation of the multifaceted polygonal mirror.

Accordingly, it is an object of the present invention to provide a dynamic focusing apparatus for an imaging system comprising a plurality of alternating flat and curved mirrored surfaces to increase the depth of field of the system.

It is another object of the present invention to provide a dynamic focusing apparatus for an imaging system which employs at least one piezoelectrically actuated deformable mirror to increase the depth of field of the imaging system.

Other objects and advantages of the system will become apparent to those skilled in the art after reading the detailed description of a presently preferred embodiment.

DETAILED DESCRIPTION OF THE PREFERRED EMBODIMENT

Figure 1:
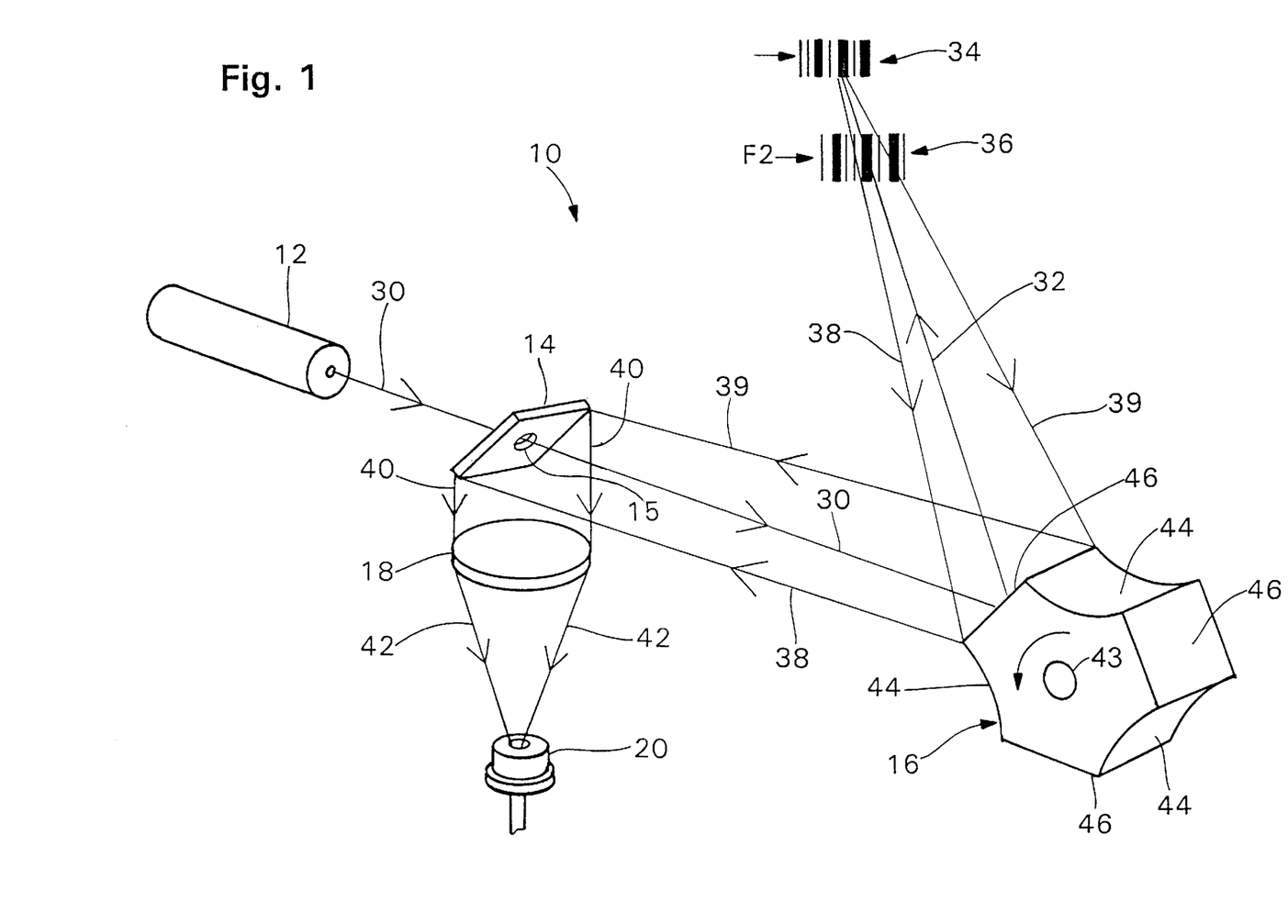
FIG. 1 is a perspective view of an optical scanner of the present invention including a dynamic focusing system.

The preferred embodiment will be described with reference to drawing figures where identical numerals represent similar elements throughout. An imaging system, shown as an optical laser scanner 10, in accordance with the present invention is shown in FIG. 1. The laser scanner 10 includes a laser 12, a collecting mirror 14, a polygonal scan mirror 16, focusing optics 18 and a light detection means 20, such as a photodiode, PMT, or a CCD detector. The laser 12 includes a laser diode and associated focusing and collimating optics for producing a laser beam 30. The beam 30 is projected from the laser 12 to pass through an aperture 15 in the collecting mirror 14. In the preferred embodiment, the aperture 15 comprises a transparent portion of the collecting mirror 14 to pass the desired wavelengths of light. Alternatively, the aperture 15 may comprise a circular section which has been removed from the collecting mirror 14, with a circumference 15 to accommodate the laser beam 30.

The laser beam 30 passes through the aperture 15 and strikes the multifaceted polygonal scan mirror 16. The scan mirror 16 is mounted on a motor (not shown) for rotation about a center post 43. Preferably the rotation speed is at least 3,000 rpm. However, the speed may be increased or decreased depending upon the particular application. The laser beam 30 is reflected from each successive facet of the rotating scan mirror 16 to produce a scanning beam 32, which is directed toward a region of interest, shown as two bar code labels 34, 36. As the scan mirror 16 rotates, each facet produces one complete sweep of the scanning beam 32 across the bar code labels 34, 36.

Light reflected from the bar code labels 34, 36, shown by lines 38, 39 is directed back to the rotating scan mirror 16, which directs the reflected light 38, 39 toward the collecting mirror 14. The collecting mirror 14 reflects the light 40 toward focusing optics 18, which focus the reflected light 40 onto the photodetector 20. The focusing optics 18 may be adjusted as required to accommodate location of the photodetector 20 at different distances from the collecting mirror 14. The photodetector 20 generates an output signal corresponding to the intensity of the light 42 focused upon the photodetector 20. This signal is forwarded to an analog-to-digital circuit (not shown) and then to a microprocessor (not shown) for further processing and decoding. The photodetector 20 may comprise an infrared or a multi-spectral detector if it is desired to operate the laser scanner 10 in a portion of the light spectrum other than in the visible light portion.

It should be understood by those skilled in the art that the laser beam optical path may be altered without significantly departing from the spirit and scope of the present invention. For example, a plurality of mirrors may be inserted between the scan mirror 16 and the bar code labels 34, 36 to produce an "X" scanning pattern.

In the preferred embodiment of the laser scanner 10, the polygonal scan mirror 16 has alternating concave mirror facets 44 and flat mirror facets 46. Alternating the concave and flat facets results in a greater depth of field for the optical scanner 10. The flat facets 46 have an optical power of zero. The concave facets 44 may either be of the same optical power, or each facet 44 may be of a different curvature (or concavity) to vary the optical power. Each facet is configured uniformly such that a beam hitting any portion of the facet will be subject to the same optical power. Accordingly, each facet is uniform with respect to itself. The ideal configuration is elliptical, although a spherical configuration may also be used. Preferably, the polygonal scan mirror 16 has a total of at least six facets, although the number of facets may be greater or lesser to accommodate different scanning rates and applications.

In operation, the laser beam 30 strikes a first facet 46 of the polygonal scan mirror 16, which is shown as flat in FIG. 1. The resulting scanning beam 32 is then projected at a fixed focal point F1. As the polygonal scan mirror 16 is rotated, a successive facet 44 is rotated into the path of the laser beam 30. The laser beam 30 is reflected from this facet 44, shown as a concave facet. Since the concave facet 44 has a different curvature and optical power than the flat facet 46, the scanning beam 32 is focused at a different focal point F2. In this manner, the scanning beam 32 may be focused upon a region of interest that is further from, or closer to, the polygonal scan mirror 16. Since the scanning beam 32 may be focused at two different focal points, the overall depth of field of the optical laser scanner 10 is increased.

Figure 2:
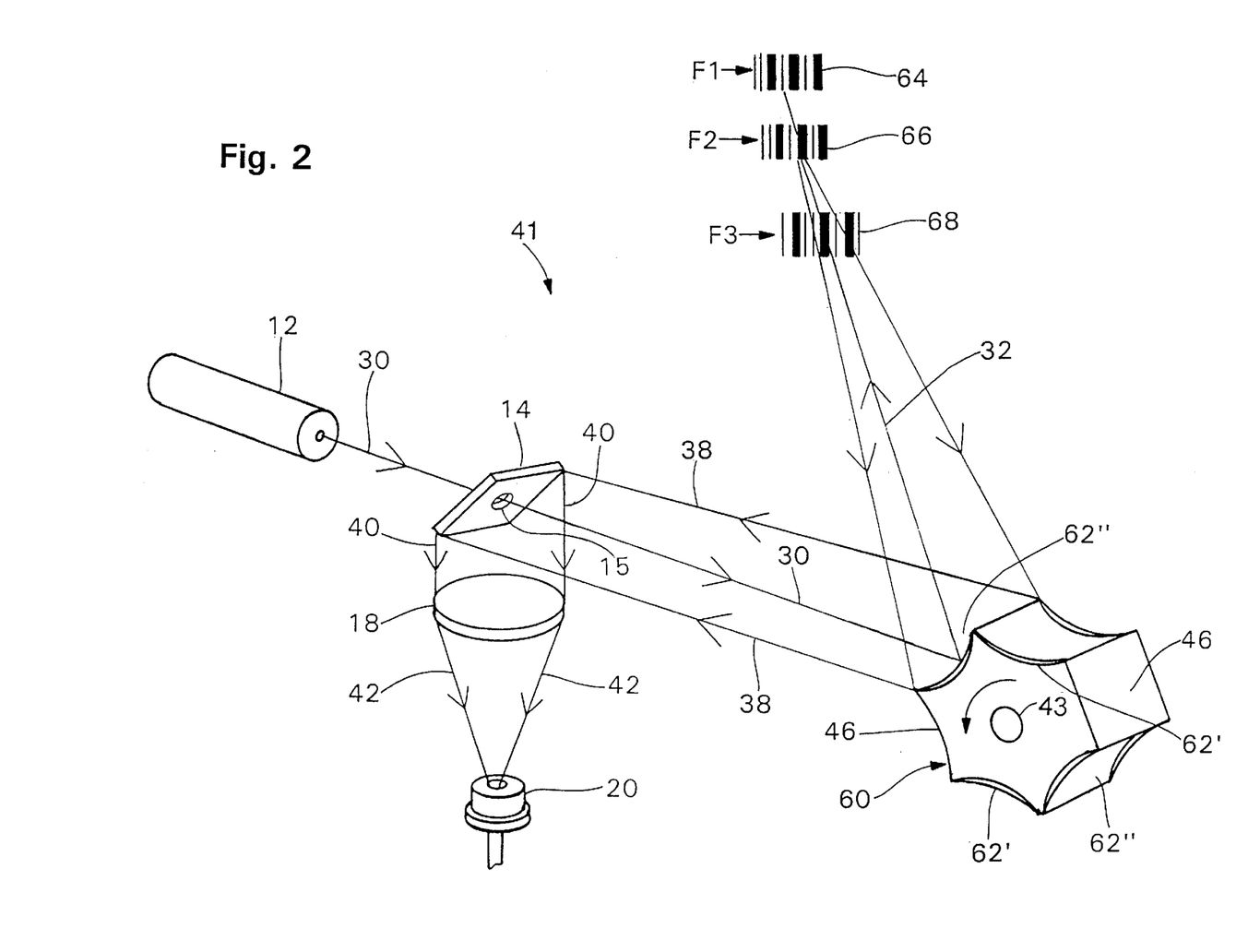
FIG. 2 is a perspective view of an alternative embodiment of an optical scanner including a rotating mirror with a plurality of concave facets.

An alternative embodiment, shown in FIG. 2, employs a polygonal scan mirror 60 with a plurality of flat 46 and concave facets 62', 62"; each concave facet 62', 62" having a different curvature and, thus, a different optical power. As the polygonal scan mirror 60 rotates, the scanning beam 32 is successively focused on the bar code labels 64, 66, 68 by the flat facets 46 and the two different concave facets 62', 62" at three distinct focal points, F1, F2 and F3. Focal point F1 is created by reflection from the flat facets 46; focal point F2 is created by reflection from the first concave facet 62'; and focal point F3 is created by reflection from the second concave facet 62". The result is that the optical laser scanner 60 has an increased depth of field encompassing focal points F1, F2 and F3.

Figure 3:
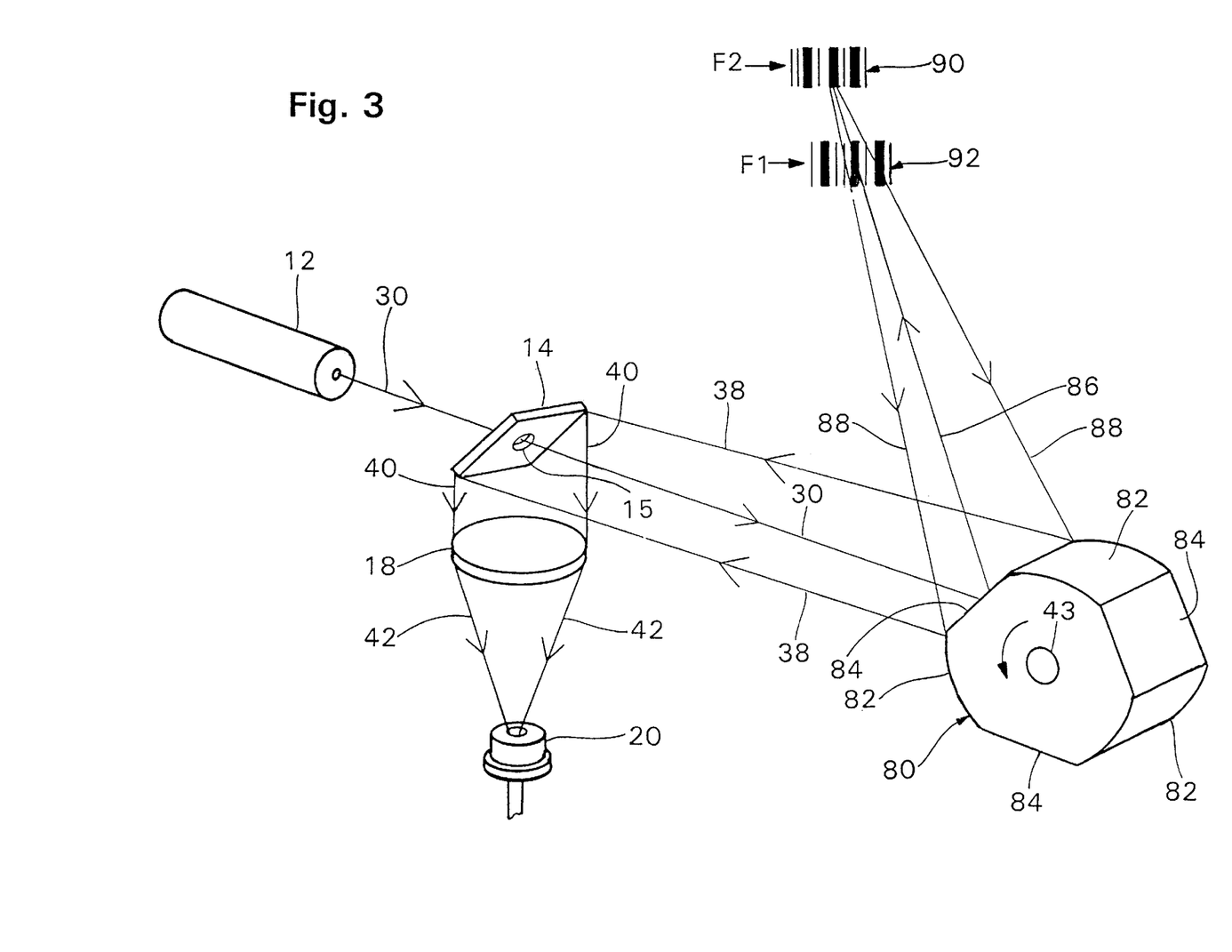
FIG. 3 is a perspective view of a second alternative embodiment of an optical scanner including a rotating mirror with a plurality of convex facets.
Figure 4:
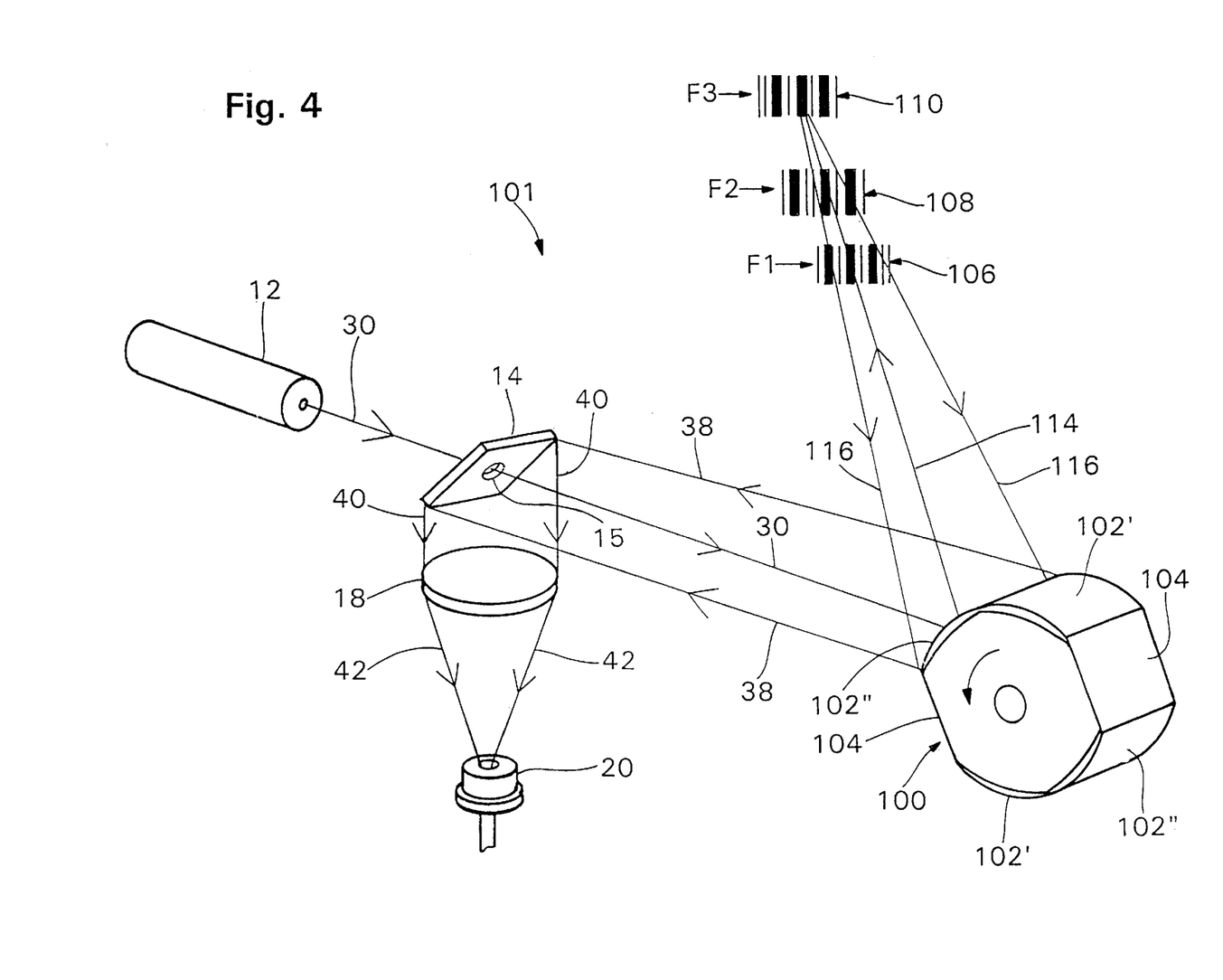
FIG. 4 is a perspective view of a third alternative embodiment of an optical scanner including a rotating mirror with a plurality of convex facets having different optical powers.

A second alternative embodiment of the present invention is shown in FIG. 3. In this embodiment, the polygonal scan mirror 80 has alternating convex facets 82 and flat facets 84. The flat facets 84 have an optical power of zero. The convex facets 82 may be of the same curvature as shown in FIG. 3, or may be of a different curvature to vary the optical power as shown in FIG. 4. The ideal convex configuration is elliptical, although a spherical configuration may be used.

Referring to FIG. 4, each convex facet 102', 102" has a different curvature. As the polygonal scan mirror 100 rotates, the scanning beam 114 is successively focused on the bar codes 106, 108, 110 by the flat facets 104 and the two convex facets 102', 102" at three distinct focal points, F1, F2 and F3. Focal point F1 is created by reflection from the flat facets 104; focal point F2 is created by reflection from the first convex facet 102'; and focal point F3 is created by reflection from the second convex facet 102". The result is that the scanner 101 has an increased depth of field encompassing focal points F1, F2 and F3.

Figure 5:
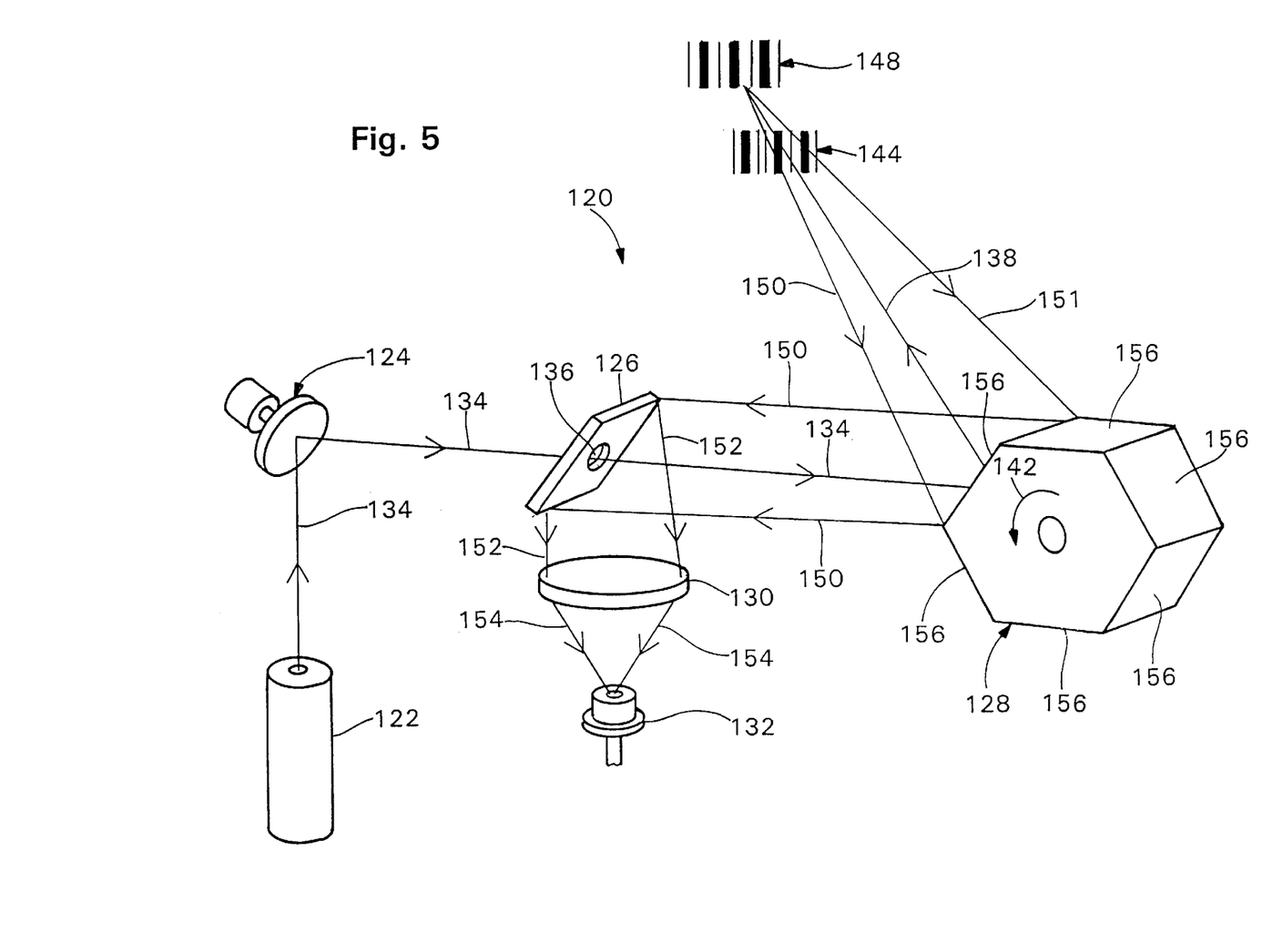
FIG. 5 is a perspective view of a fourth alternative embodiment of an optical scanner including a piezoelectrically actuated deformable mirror assembly.

A fourth alternative embodiment of the present invention is shown in FIG. 5. In this embodiment, the optical laser scanner 120 includes a laser with associated optics 122, a piezoelectric deformable mirror assembly 124, a collecting mirror 126, a polygonal scan mirror 128, focusing optics 130 and a light detection means 132, such as a photodetector. The laser 122 produces a beam of light 134 which strikes the deformable mirror assembly 124. The laser beam 134 is reflected by the deformable mirror assembly 124 through the aperture 136 of the collecting mirror 126, and onto the polygonal scan mirror 128, which produces a scanning beam 138 as the polygonal scan mirror 128 rotates.

The scanning beam 138 is directed toward bar code labels 144, 148, and light is reflected from the bar code labels 144, 148, (shown by lines 150, 151), back toward the polygonal scan mirror 128. The light 150, 151 is reflected from the polygonal scan mirror 128 to the collecting mirror 126, the focusing optics 130 and the photodetector 132. As shown, the polygonal scan mirror 128 is provided with all flat facets 156, each with an optical power equal to zero.

Figure 5A:
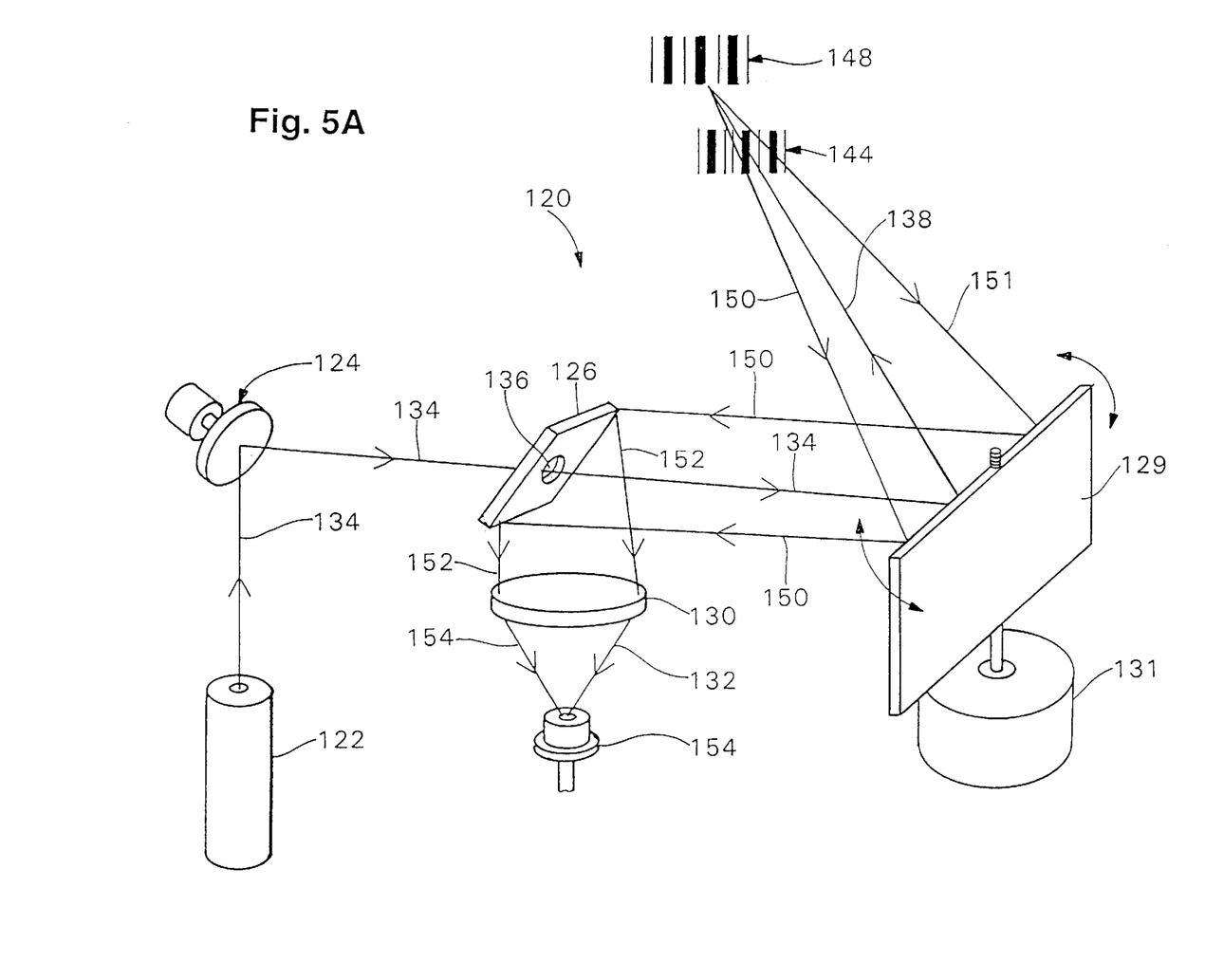
FIG. 5A is a perspective view of the embodiment of FIG. 5 including an oscillating mirror.

Alternatively, as shown in FIG. 5A, the rotating polygonal scan mirror 128 may be replaced by an oscillating mirror 129, actuated by a motor 131 for producing the scanning beam 138.

Figure 6:
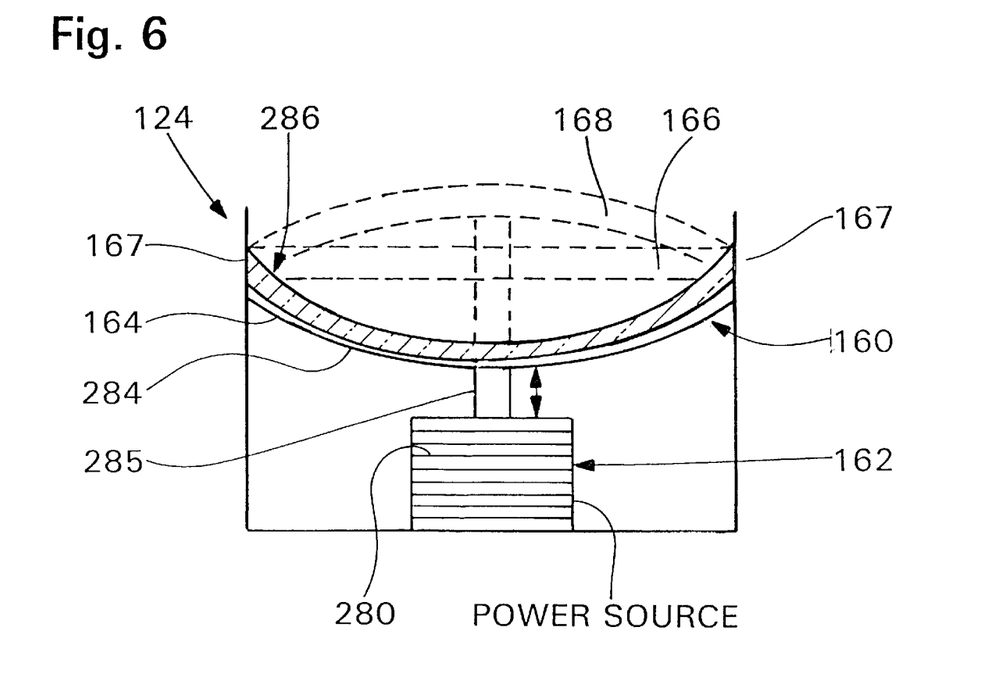
FIG. 6 is a side view of the piezoelectric mirror assembly of FIG. 3.

In operation, the laser beam 134 reflected off the deformable mirror assembly 124, which is selectively deformed to focus the scanning beam 138 at different focal lengths. As shown in detail in FIG. 6, the deformable mirror assembly 124 comprises a mirror 160 and a piezoelectric actuator 162. The piezoelectric actuator 162 is a linear actuator which comprises a piezoceramic stack 280. The stack 280 may be coupled to a substrate layer 284 via a shaft 285, as shown in FIG. 6, or may be glued or otherwise bonded. Alternatively, the stack 280 may not be physically attached to the substrate layer 284, but may be positioned against the substrate layer 284 such that when the stack 280 expands, it forces the substrate layer 284 to deform. Preferably, the substrate layer 284 is glass or silicon, having a mirrored surface 286. When a dc bias is applied to the piezoceramic stack 280, the piezoceramic stack 280 moves the shaft 285. Since the edge 167 of the substrate layer 284 is rigidly fixed, the mirror 160 becomes deformed. Selective control of the dc biasing provides the desired deformation of the mirror 160, which varies the optical power of the mirror 160.

Figure 7:
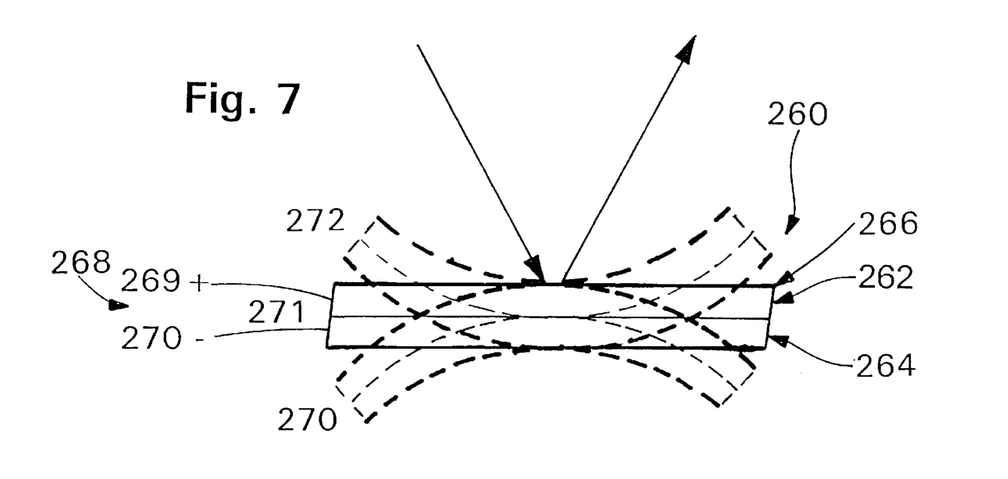
FIG. 7 is a side view of a bimorph type piezoelectric mirror assembly.
Figure 8:
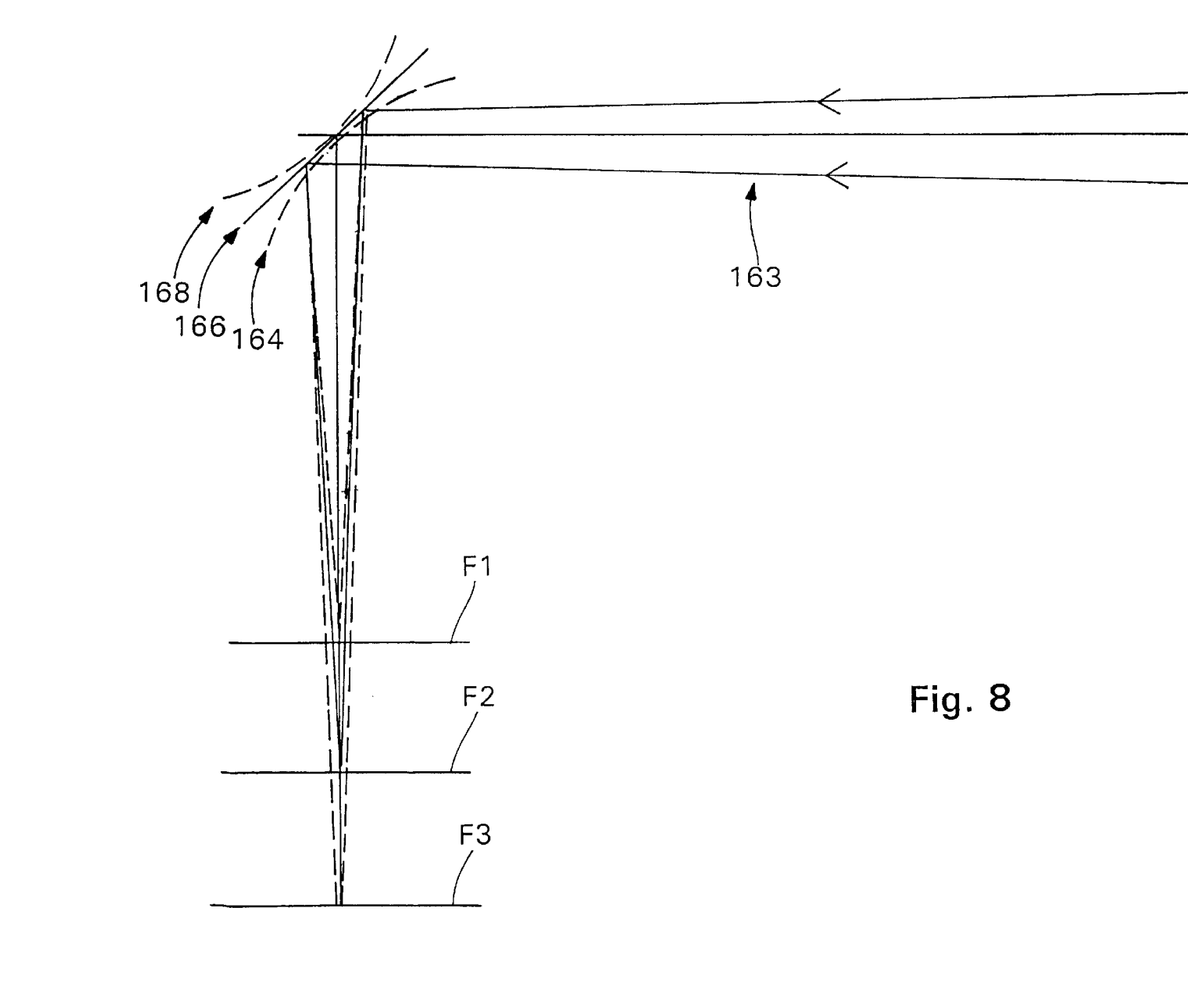
FIG. 8 is a schematic view of the focusing range of different mirror shapes.

Those of skill in the art would recognize that a bimorph actuator 260, shown in FIG. 7, may be utilized in the deformable mirror assembly 124. The bimorph actuator 260 includes a metal electrode layer 262, a piezoceramic layer 264 and a mirrored surface 266. A dc voltage source 268 is connected to the mirror 260 by a positive lead 269 and negative lead 270. A dc bias applied to the leads 269, 270 results in deformation of the mirrored surface 266. As previously described, the mirrored surface 260 is deformable to a plurality of positions 270, 271 and 272. In this manner, the optical power of the deformable mirror 162 is varied to focus the scanning beam 163 at a plurality of focal points as shown in FIG. 8. The substantially concave mirror position 164 focuses the scanning beam 138 at a relatively short focal point F1. The substantially flat mirror position 166 focuses the scanning beam 138 at a focal point F2, which is further than F1. The substantially convex mirror position 168 is focused even further at F3.

The deformable mirror assembly 124 may also be selectively deformed at different rates, depending upon the desired application. In a first mode, the deformable mirror assembly 124 is synchronized to the rotation rate of the polygonal scan mirror 128 such that each successive facet 156 is focused differently. In a second mode, the deformable mirror assembly 124 is deformed to a specific optical power and remains constant as determined by a range finding or distance sensing device. Accordingly, the scanner 126 maintains the focal point for the entire duration the object is detected by the distance sensing device. In a third mode, the deformable mirror assembly 124 is deformed to a specific optical power for a predetermined period of time. In a fourth mode, the deformable mirror assembly 124 is deformed dynamically, in response to the range finding or distance sensing device, during the scanning time of a particular facet 156 such that the laser beam 138 is always properly focused on a detected object.

Figure 9:
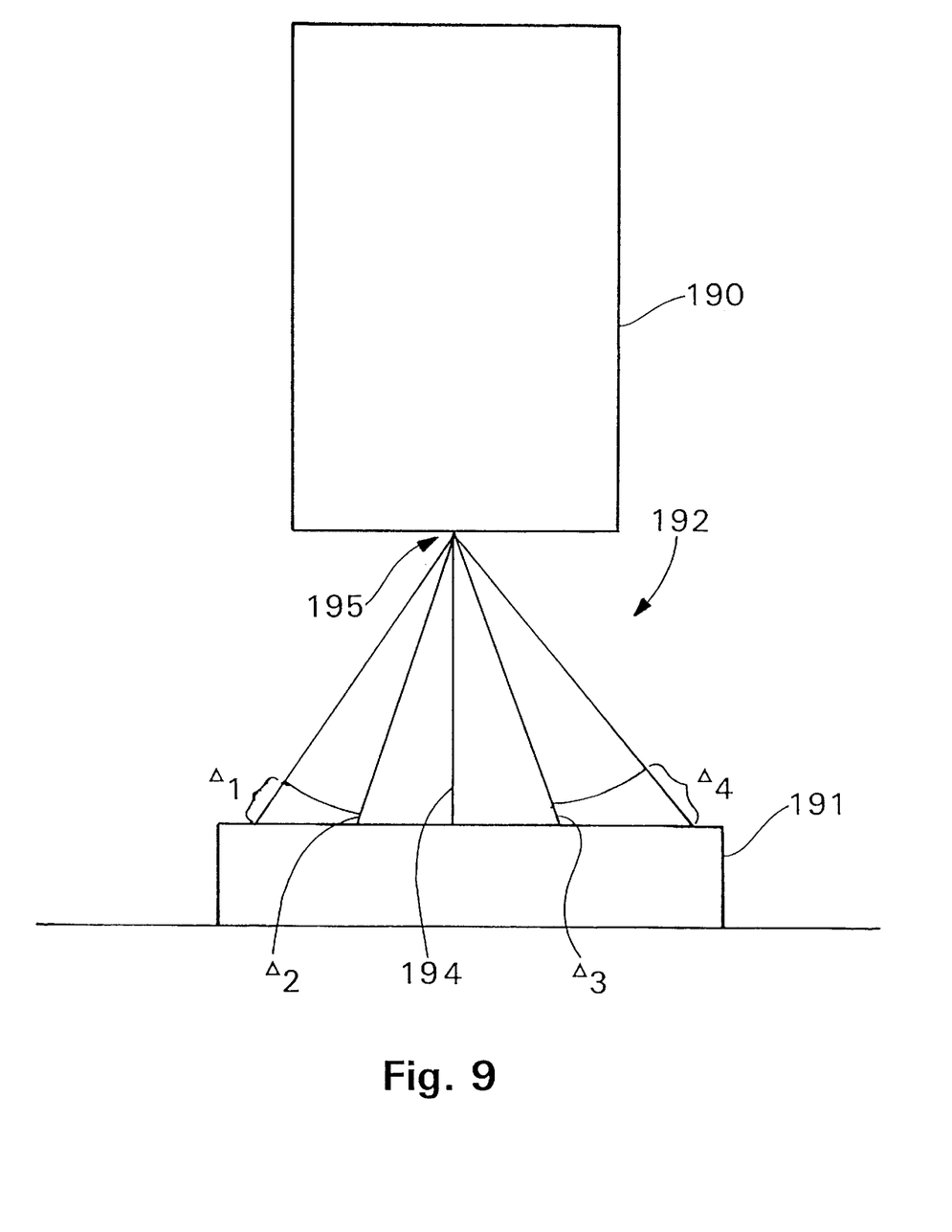
FIG. 9 is a schematic view of a beam scanning across an object.

The fourth mode is particularly well suited for: 1) scanning bar code labels located on irregularly shaped objects; and 2) compensating for the natural variation in the focusing distance of a scanning beam at the beginning or end of a scan line. For example, as shown in FIG. 9, when a scanner 190 is scanning an object 191 with a scanning beam 192, the distance between the scanning head 195 and the point at which the scanning beam falls upon the object 191 will be different as the scanning 192 progresses from the beginning of the scan to the end of scan. Accordingly, at the beginning of a scan 193, the distance between the scanning head 195 and the point at which the scanning beam 192 falls upon the object 191 will be greater than when the scanning beam 192 is in the middle of a scan 194. This results in a difference ($\Delta_1$ ...$\Delta_N$) in the focal point depending upon the position of the rotating polygonal mirror. The fourth mode of the present invention takes into account the $\Delta$ to ensure takes this difference into account to ensure that the scanning beam 192 is properly focused throughout each scan. It would be appreciated by those skilled in the art that other timing schemes may be devised without departing from the scope and spirit of the present invention.

Figure 10:
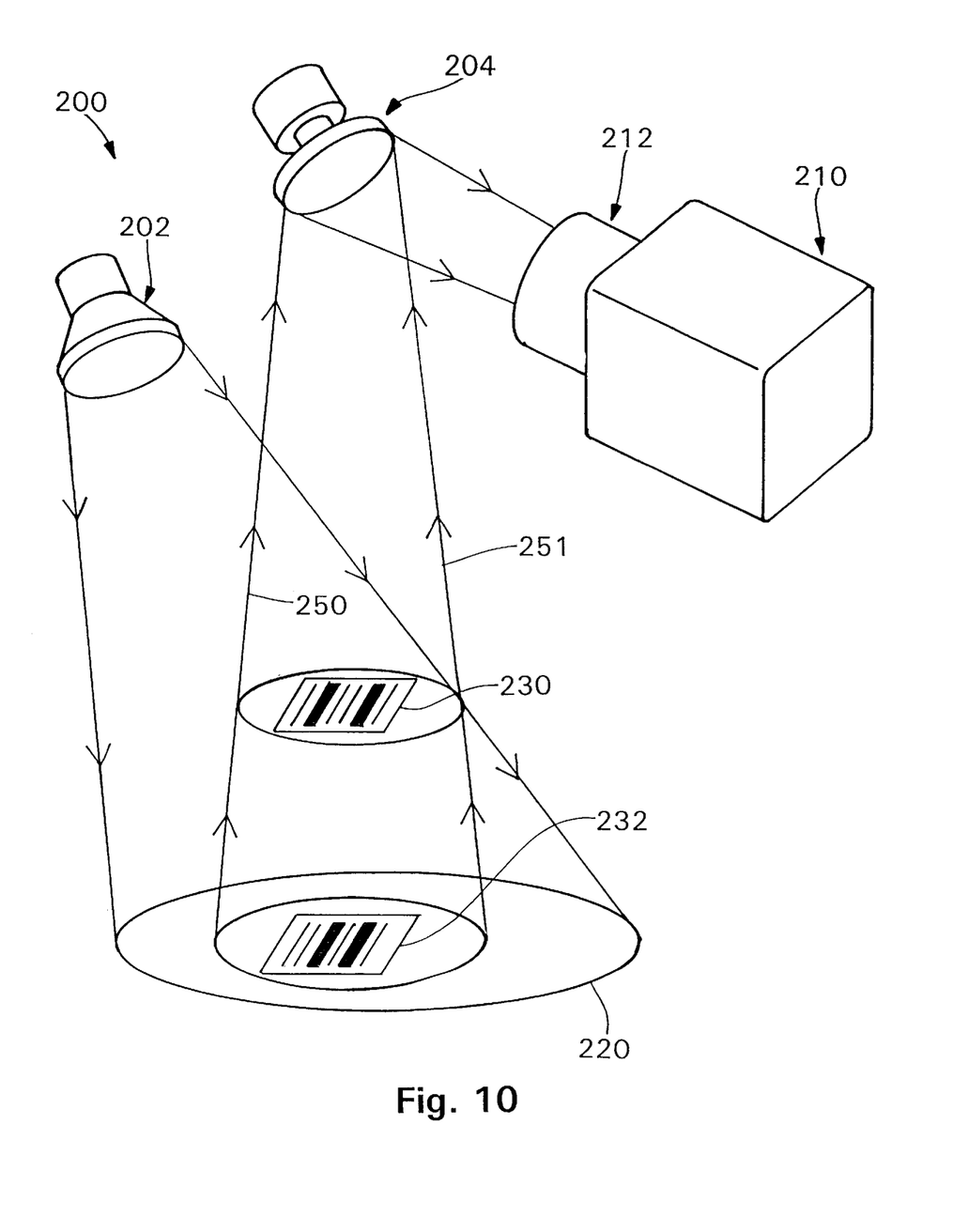
FIG. 10 is a perspective view of a fifth alternative embodiment of an optical scanner employing a CCD camera.

A fifth alternative embodiment of the present invention is shown in FIG. 10. The optical scanner 200 includes a light source 202, a piezoelectric deformable mirror assembly 204 and a charged coupled device (CCD) camera 210 with associated focusing optics 212.

The light source 202 produces an expansive light beam 220 sufficient to illuminate the bar code labels 230, 232. Light is reflected from the bar code labels 230, 232, (as shown by lines 250, 251), toward the deformable mirror assembly 204, which redirects the light 250 through the optics 212 to the CCD camera 210.

The optical power of the deformable mirror assembly 204 is varied to provide the CCD camera 210 with properly focused images of the bar codes 230, 232 throughout the depth of field. As the deformable mirror assembly 204 changes from a substantially concave position to a substantially convex position, objects located at different distances from the optical scanner 200 will come into focus. For example, bar code label 230 will be in focus when the deformable mirror assembly 204 is in a substantially concave position, while bar code label 232 will be in focus when deformable mirror assembly 204 is in a substantially convex position. Although the deformable mirror assembly 204 is shown located on the object side of the focusing optics 212, those of skill in the art would appreciate that the deformable mirror assembly could be located on the image side of optics 212.

Figure 11:
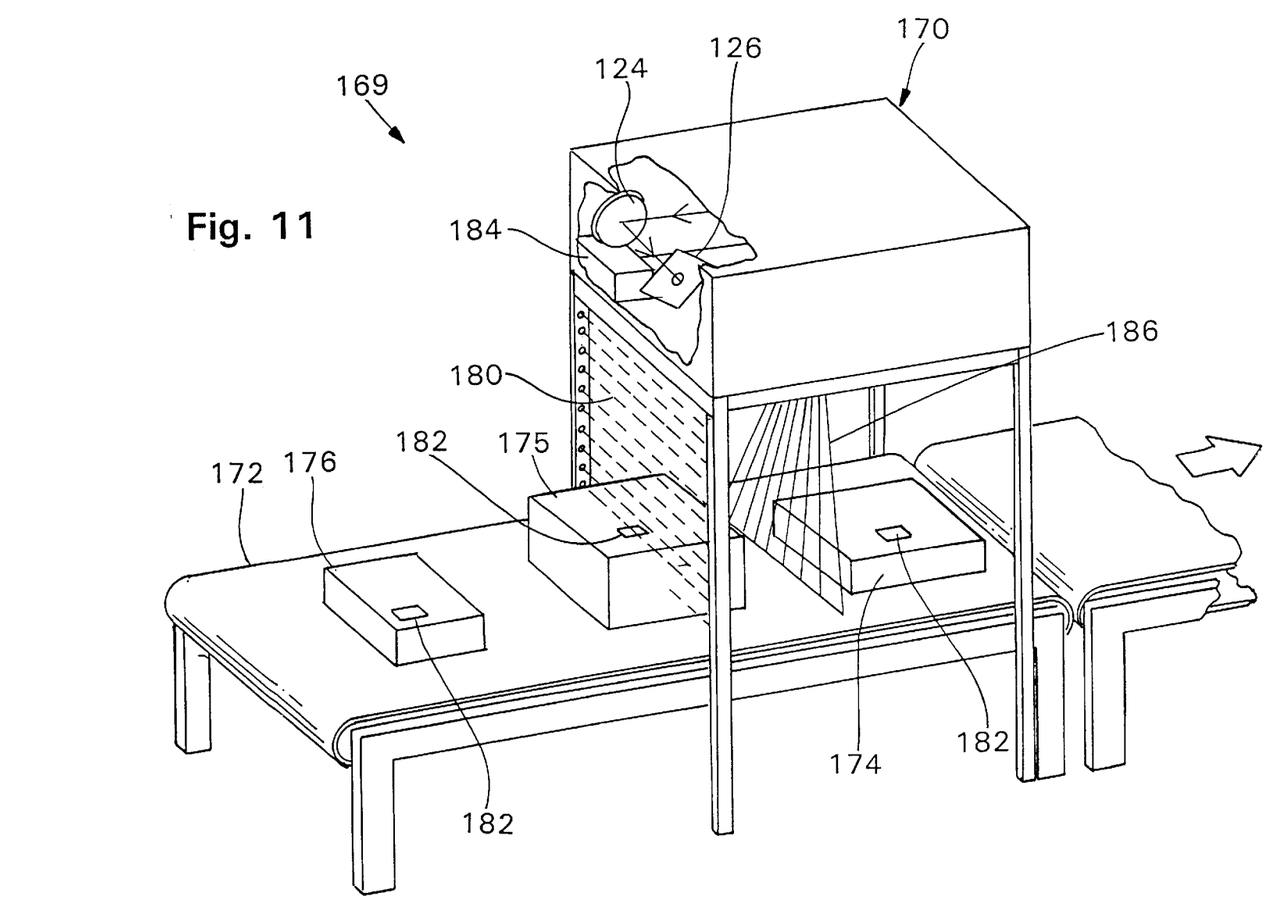
FIG. 11 is a perspective view of a free standing optical scanner of the present invention positioned above a conveyor.

An imaging system 169 including the dynamic focusing apparatus of the present invention is shown in FIG. 11. The apparatus is contained within a housing 170 which is positioned above a conveyor 172. Packages 174, 175 and 176 are transported along the conveyor 172 and pass through a range finding or distance sensing device 180, shown as a light curtain. A bar code label 182 is located upon each package 174, 175, 176. As the packages 174, 175, 176 move along the conveyor 172, the light curtain 180 detects the height of the package 175 and forwards a height signal to a controller 184. The controller 184 controls the piezoelectric actuator 162 to selectively provide the proper deformation of the deformable mirror 160. Accordingly, the scanning beam 186 will be focused at the top of the package 175 as the package 175 passes under the scanning beam 186.

This process is repeated for each subsequent package 176 wherein the light curtain 180 will detect the height of the package 176 and the deformable mirror assembly 124 will focus the scanning beam 186 at the distance of the package 176. The imaging system 169 shown in FIG. 11 may alternatively include the CCD scanner 200 shown in FIG. 10. Although a light curtain has been shown for illustrative purposes, it should be understood that any type of distance sensing device may be employed.

For large depth of field, high speed imaging systems, it is important that the magnification or resolution of the system be constant over the entire depth of field. If the magnification changes over the depth of field, imaging anomalies may occur, thus preventing accurate detection of an object.

Figure 12:
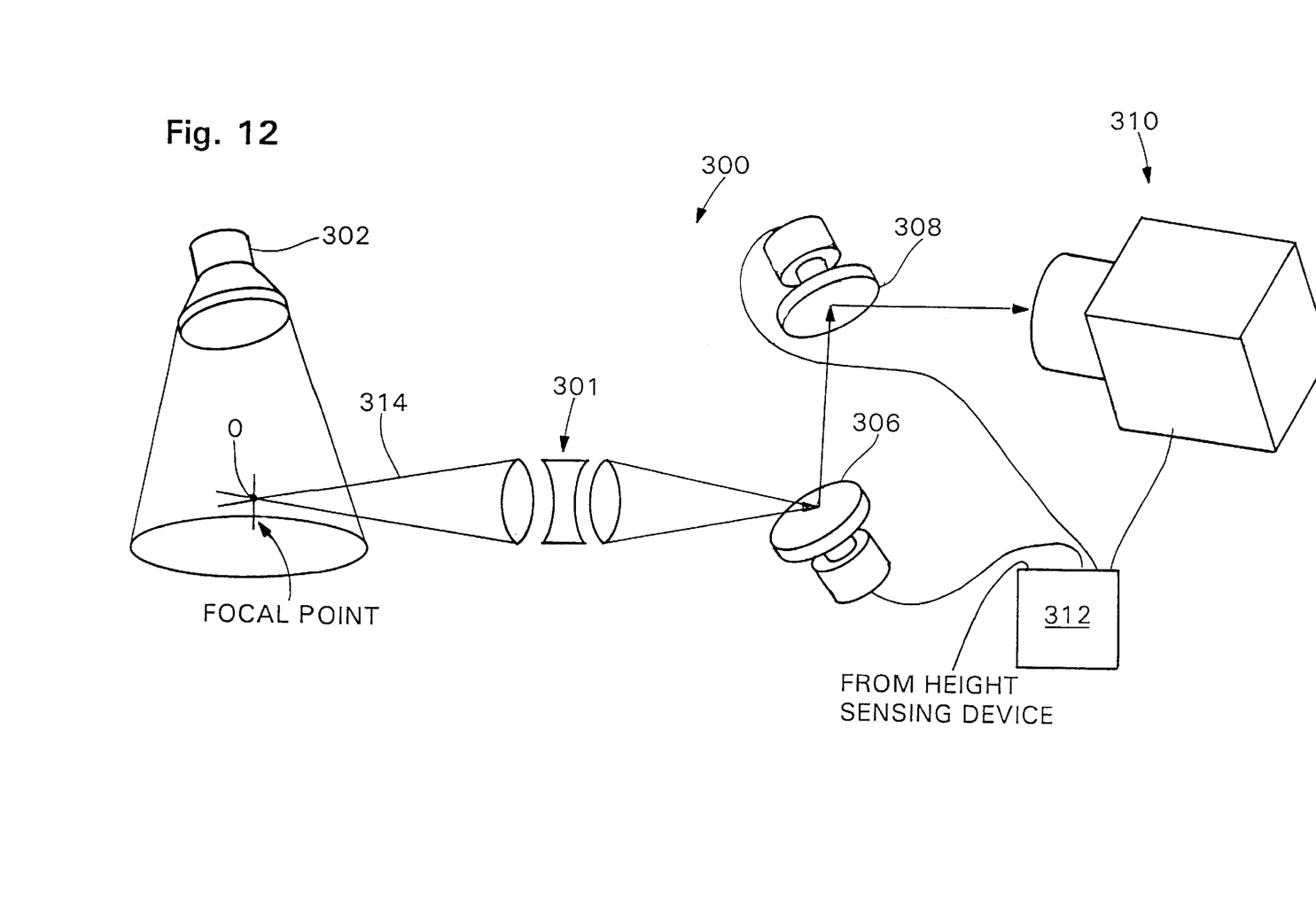
FIG. 12 is a perspective view of a sixth alternative embodiment of an optical scanner with a variable focusing apparatus with constant magnification.

In order to prevent variations in magnification or resolution, a sixth alternative embodiment of the present invention, shown in FIG. 12, provides a variable focusing apparatus 300 with constant magnification. This apparatus 300 comprises a light source 302, focusing optics 301, two complementary deformable mirror assemblies 306, 308 and a CCD camera 310 including optics 309 and a CCD detector 310.

In operation, the region of interest is illuminated with the light source 302. A distance sensing device 180 (shown in FIG. 11) detects the distance between an object O located within the region of interest and the scanner 300. The distance sensing device 180 provides an input to a microprocessor 312 which controls overall operation of the system 300. The microprocessor 312 provides a first dc output bias to the first deformable mirror assembly 306, thereby causing the deformable mirror assembly 306 to deform. The deformation focuses the lens system (comprising the elements 301, 306 and 308) at the location of the object O. Additionally, the microprocessor 312 provides a second dc output bias, which complements the first dc output bias, to the second deformable mirror assembly 308, thereby causing the deformable mirror assembly 308 to deform and maintain constant magnification of the lens system. The biasing of the mirror assemblies 306, 308 must be coordinated to provide the proper focusing and magnification at each object O distance.

As is well known to those skilled in the art, the microprocessor 312 may utilize a lookup table to store the dc output bias levels. After the distance between the object O and the scanner 300 is detected, the distance is input to the lookup table which provides the proper dc output bias. The use of the lookup table by the microprocessor 12 permits real time operation the system 300. Through deformation of both of the deformable mirror assemblies 306, 308, proper focus and magnification is obtained.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A scanner for use in reading coded symbologies located at various distances from the scanner, the scanner comprising:

a distance sensing device for determining a distance between the scanner and a region to scan for said coded symbologies;

means for illuminating said region;

deformable mirror means for focusing light on said region in response to the determined distance; and means for detecting light reflected from said region.

2. The scanner of claim 1 wherein said deformable mirror focuses light incident on said second region.

3. The scanner of claim 1 wherein said illuminating means produces an expansive light beam for illuminating said region and said region is an expansive region sufficient to contain an entire coded symbology.

4. The scanner of claim 3 wherein said deformable mirror focuses light reflected from said expansive region.

5. The scanner of claim 4 further including a second deformable mirror means for varying the magnification of said reflected light.

6. The scanner of claim 3 wherein the expansive light beam has a cross sectional area sufficient to illuminate an entire coded symbology.

* * * * *

UNITED STATES PATENT AND TRADEMARK OFFICE
CERTIFICATE OF CORRECTION

PATENT NO. : 6,053,409
DATED : April 25, 2000
INVENTOR(S) : Thomas J. Brobst, Edward I. Chaleff, Kurt Hecht, Michael Veksland, Albert Wurz It is certified that error appears in the above-indentified patent and that said Letters Patent is hereby corrected as shown below:

In column 8, line 25 (which corresponds to claim 2, line 2) the word "second" should be --scanned--.

Signed and Sealed this

Twenty-seventh Day of March, 2001

Attest:

NICHOLAS P. GODICI

Attesting Officer

Acting Director of the United States Patent and Trademark Office